United States Patent [19]

Miyazaki

[11] Patent Number: 5,802,447
[45] Date of Patent: Sep. 1, 1998

[54] TRANSMITTER-RECEIVER FOR A RADIO COMMUNICATION APPARATUS

[75] Inventor: Kazuto Miyazaki, Tachikawa, Japan

[73] Assignee: Casio Computer Co., Ltd., Tokyo, Japan

[21] Appl. No.: 594,640

[22] Filed: Feb. 2, 1996

[30] Foreign Application Priority Data

Feb. 8, 1995 [JP] Japan .................. 7-044947

[51] Int. Cl.$^6$ .................................................. H04B 1/44
[52] U.S. Cl. .................. 455/76; 455/83; 455/86
[58] Field of Search .................. 455/73, 76, 84, 455/85, 86, 83; 370/276, 280, 277, 278, 294

[56] References Cited

U.S. PATENT DOCUMENTS

| | | | |
|---|---|---|---|
| 4,903,257 | 2/1990 | Takeda et al. | 455/86 |
| 5,319,798 | 6/1994 | Watanabe | 455/76 |
| 5,355,524 | 10/1994 | Higgins, Jr. | 455/86 |
| 5,444,863 | 8/1995 | Torii | 455/83 |
| 5,467,065 | 11/1995 | Turunen et al. | 370/277 |

*Primary Examiner*—Nguyen Vo
*Attorney, Agent, or Firm*—Frishauf, Holtz, Goodman, Langer & Chick

[57] ABSTRACT

A radio signal received by an antenna is supplied to a SAW bandpass filter, and a signal of a carrier frequency band is extracted and supplied to a first mixer. On the basis of a first receiving local signal supplied from a local signal generator, the first mixer generates a signal of an intermediate frequency band and supplies the signal to a second mixer. The second mixer demodulates a baseband signal from the intermediate-frequency signal by using a second local signal as an output from a TCXO circuit which generates a reference signal to the local signal generator. The baseband transmitting signal is supplied to a quadrature modulator where a transmitting local signal (carrier-band signal) supplied from the local signal generator is modulated by the baseband transmitting signal. The carrier-band modulated signal is supplied to the antenna via a high-power amplifier and transmitted from the antenna as a radio signal.

5 Claims, 9 Drawing Sheets

TRANSMITTER-RECEIVER FOR A RADIO COMMUNICATION APPARATUS

BACKGROUND OF THE INVENTION

1. Field of the Invention

The present invention relates to a transmitter-receiver for a radio communication apparatus, e.g., a communication terminal in a TDMA-TDD radio communication system.

2. Description of the Related Art

Transmitter-receivers for use in communication terminals in a conventional TDMA (Time Division Multiple Access) —TDD (Time Division Duplex) radio communication system are classified in accordance with two modulation methods, i.e., an indirect modulation method and a direct modulation method. The indirect modulation method is also called an up-conversion method.

One conventional example of transmitter-receivers using the indirect modulation method will be described below with reference to FIG. 1. An antenna 2 is used for both transmission and reception. A switch (SW) 3 is provided between the antenna 2 and a receiver/transmitter circuit and switches the antenna 2 to one of the receiver circuit and the transmitter circuit.

The receiver circuit comprises a dielectric bandpass filter (BPF) 4, a low-noise amplifier 5 as a first amplifier, a dielectric bandpass filter 6, a first mixer 7, a bandpass filter 8, a second amplifier 9, a second mixer 10, a bandpass filter 11, a limiter (LIM) 12, and a received signal strength indicator (RSSI) 13. This receiver circuit is also called a double super heterodyne system. The transmitter circuit includes a dielectric bandpass filter 14, a high-power amplifier 15, a dielectric bandpass filter 16, an up mixer 17, and a quadrature modulator (IQ modulator) 18.

The transmitter-receiver further comprises a first local signal generator, a second local signal generator, and a temperature compensated X'tl oscillator (TCXO) circuit 27. The first local signal generator includes a first phase-locked loop (PLL) circuit 19, a first voltage-controlled oscillator (VCO) 20, and switches 21 and 22 and generates a first receiving local signal to be supplied to the first mixer 7 and an up-converting local signal to be supplied to the up mixer 17. The second local signal generator includes a second PLL circuit 23, a second VCO 24, and switches 25 and 26 and generates a second receiving local signal to be supplied to the second mixer 10 and a local signal to be supplied to the quadrature modulator 18. The TCXO circuit 27 supplies a reference oscillation signal to the first and second PLL circuits 19 and 23. Although not shown, a control circuit supplies control data for determining the oscillation frequency of the VCO to the first PLL circuit 19.

In this indirect modulation type transmitter-receiver, a radio signal received by the antenna 2 is input to the receiver circuit via the switch 3. The first dielectric bandpass filter 4 extracts a signal of a predetermined frequency band including a carrier frequency band (1895.15 to 1917.95 MHz) from the received radio signal. The extracted signal is amplified with a predetermined amplification factor by the low-noise amplifier 5 and supplied to the second dielectric bandpass filter 6. The filter 6 further extracts a signal of a frequency near the carrier frequency band. The output from the filter 6 is supplied to the mixer 7 and frequency-converted by using the first receiving local signal (1655.1 to 1677.9 MHz) supplied from the first local signal generator via the switch 21. The result is an intermediate-frequency signal of 240.05 MHz.

FIG. 2 shows the frequency characteristics of the dielectric bandpass filters 4 and 6. Since dielectric bandpass filters have wide bands, an image frequency band is designed to be a band of 1415.05 to 1437.85 MHz which is 75% of the carrier frequency band (1895.15 to 1917.95 MHz). The frequency band of the first receiving local signal is set to meet this image frequency band. Accordingly, it is necessary to lower the frequency of the first receiving local signal to 1655.1 to 1677.9 MHz, and so the output intermediate frequency from the first mixer 7 must be as high as 240.05 MHz. Consequently, the first and second PLL circuits 19 and 23 must be provided for reception.

This intermediate-frequency signal is input to the bandpass filter 8 where noise components are removed, and the signal is amplified with a predetermined amplification factor by the second amplifier 9. The output from the amplifier 9 is supplied to the second mixer 10 and frequency-converted by using the second receiving local signal (229.25 MHz) supplied from the second local signal generator via the switch 25. The result is an intermediate-frequency signal of 10.8 MHz. In this manner, a desired signal is output. The output signal is supplied to the bandpass filter 11 where a signal of an unnecessary frequency band is removed, and the resultant signal is supplied to the limiter 12 and the RSSI 13.

The upper and lower portions of the amplitude of the output signal are cut at predetermined levels by the limiter 12, and the resultant signal is output as a phase component to a modem unit (not shown) in the subsequent stage. At the same time, the RSSI circuit 13 detects the reception level and outputs the detected level as an amplitude component to a control circuit (not shown) in the subsequent stage.

In transmission, input baseband signals I and Q from the modem unit to the transmitter circuit are supplied to the quadrature modulator 18. These I and Q signals modulate the local signal (229.25 MHz) supplied from the second local signal generator via the switch 26. The up mixer 17 frequency-converts (up-converts) the modulated signal into a signal of the carrier frequency band by using the up-converting local signal (1665.9 to 1688.7 MHz) supplied from the first local signal generator via the switch 22.

The dielectric bandpass filter 16 removes the local signal component (1665.9 to 1688.7 MHz) and the modulated component (229.25 MHz) from the output modulated signal from the mixer 17 and extracts a signal of the carrier frequency band (1895.15 to 1917.95 MHz). The output from the filter 16 is amplified with a predetermined amplification factor by the high-power amplifier 15. The dielectric bandpass filter 14 which is provided for the same reason as the bandpass filter 16 further removes the local signal component (1665.9 to 1688.7 MHz) and the modulated component (229.25 MHz) from the output of the amplifier 15. The resultant signal is transmitted as a radio signal from the antenna 2 via the switch 3.

In the transmitter circuit of this indirect modulation type radio transmitter-receiver, the baseband signals I and Q once modulate the local signal (229.25 MHz) from the second local signal generating circuit in the quadrature modulator 18 and the modulated signal is then up-converted into a signal of a carrier frequency band of 1895.15 to 1917.95 MHz by the up mixer 17 and the first local signal generator. Therefore, it is necessary to use two local signal generators, i.e., the first local signal generator whose oscillation frequency is 1665.9 to 1688.7 MHz and the second local signal generator whose oscillation frequency is 229.25 MHz. This increases the circuit scale and the consumption power during transmission.

Also, the first and second local signal generators require the first and second PLL circuits 19 and 23 and the first and second VCOs 20 and 24, respectively, resulting in an increased circuit scale. Accordingly, when these circuits are to be integrated, the size of an LSI chip is increased to lead to an increase in cost.

Additionally, in the up-converting up mixer 17, a large amount of a spurious component which acts as an interference wave during frequency conversion is generated in the carrier frequency. To remove this spurious component, the dielectric bandpass filters 14 and 16 must be provided in the transmitter circuit. This also increases the cost and the circuit scale of the transmitter-receiver.

Furthermore, since the consumption power of the up-converting mixer 17 itself is large, the consumption power during transmission is further increased.

FIG. 3 is a timing chart of the circuit shown in FIG. 1. Transmission and reception are performed once in eight time slots. In the transmission and reception time slots, five circuits are operating (acting). In the other time slots, one circuit is acting, and four circuits are in a power-save state. Since the power supply is not OFF in this power-save state, power is somewhat consumed.

FIG. 4 is block diagram showing a conventional example of a transmitter-receiver using the direct modulation method as the other modulation method. FIG. 5 is a timing chart of the circuit.

A receiver circuit is the same as the conventional circuit shown in FIG. 1, and a transmitter circuit and local signal generators are different from those used in the circuit shown in FIG. 1.

The transmitter circuit comprises a high-power amplifier 30 and a quadrature modulator 31. A first local signal generator is divided into two circuit units for reception and transmission. The receiving unit includes a receiving PLL circuit 32 and a receiving VCO 34. The transmitting unit includes a transmitting PLL circuit 33 and a transmitting VCO 35. An output from the transmitting VCO 34 has the same frequency (1655.1 to 1677.9 MHz) as the output from the first VCO circuit 20 in FIG. 1 and is supplied to a first mixer 7. An output from the transmitting VCO 35 is supplied to the quadrature modulator 31. A second local signal generator for generating a second local signal (having the same frequency (229.25 MHz) as the output from the second VCO 24 in FIG. 1) to be supplied to a second mixer 10 includes a second PLL circuit 36 and a second VCO 37. An oscillation signal (19.2 MHz) of a TCXO circuit 38 is supplied as a reference oscillation signal to the PLL circuits 32 and 33 and the second PLL circuit 36.

In transmission, input baseband signals I and Q from a modem unit (not shown) to the transmitter circuit are supplied to the quadrature modulator 31. These I and Q signals modulate a transmitting local signal (1895.15 to 1917.95 MHz) of a carrier frequency band supplied from the transmitting unit of the first local signal generator. The modulated signal of the carrier frequency band is amplified with a predetermined amplification factor by the high-power amplifier 30 and transmitted as a radio signal from an antenna 2 via a switch 3.

This direct modulation method does not require the up mixer 17 in the transmitter circuit so that the local signal component and the modulated component (229.25 MHz) included in the conventional circuit shown in FIG. 1 are not present in the circuit shown in FIG. 4. Accordingly, the dielectric bandpass filters 14 and 16 are unnecessary. However, the first local signals for transmission and reception have different frequencies, and so the first local signal generator includes two circuit units and two sets of PLL circuits and VCOs are necessary. Consequently, the total circuit scale is increased. That is, although the configuration of the transmitter circuit is simple, its control is complicated, and as a result the overall transmitter-receiver is complicated and increased in size and its consumption power also is increased. As shown in the timing chart of FIG. 5, in transmission and reception slots, five circuits are operating (acting) and two circuits are in a power-save state. In the other time slots, one circuit is acting and six circuits are in the power-save state.

As described above, in conventional transmitter-receivers it is difficult to decrease the circuit scale, reduce the consumption power, and realize a low cost, regardless of whether the transmitter-receivers are of the indirect modulation type or the direct modulation type. Accordingly, these conventional transmitter-receivers are unsuitable for use as portable radio communication terminals.

SUMMARY OF THE INVENTION

It is an object of the present invention to provide a transmitter-receiver by which the circuit scale is decreased, the consumption power is reduced, and a low cost is realized, and which is suitable for use as a portable radio communication terminal.

According to the present invention, there is provided a transmitter-receiver for a radio communication apparatus, comprising a filter device for extracting a signal of a carrier frequency band from a received signal, a frequency convertor means for converting the carrier frequency band signal extracted by the filter device into a signal of a desired frequency by using a receiving local signal, a modulator for modulating a transmitting local signal of the carrier frequency band by using transmitting data, and a local signal generator for time-divisionally, selectively generating the receiving local signal and the transmitting local signal.

In the transmitter-receiver according to the present invention, a single local signal generator can generate a local signal necessary for demodulation of a received signal and a local signal necessary for modulation of a transmitting signal. Consequently, the number of circuit blocks constituting the transmitter-receiver can be decreased, and this decreases the circuit scale. Also, the consumption of power during transmitting and receiving operations can be reduced. As a result, a low cost of the transmitter-receiver is realized.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which.

DETAILED DESCRIPTION OF THE PREFERRED EMBODIMENTS

A preferred embodiment of a transmitter-receiver according to the present invention will now be described with reference to the accompanying drawings.

Figure 6:
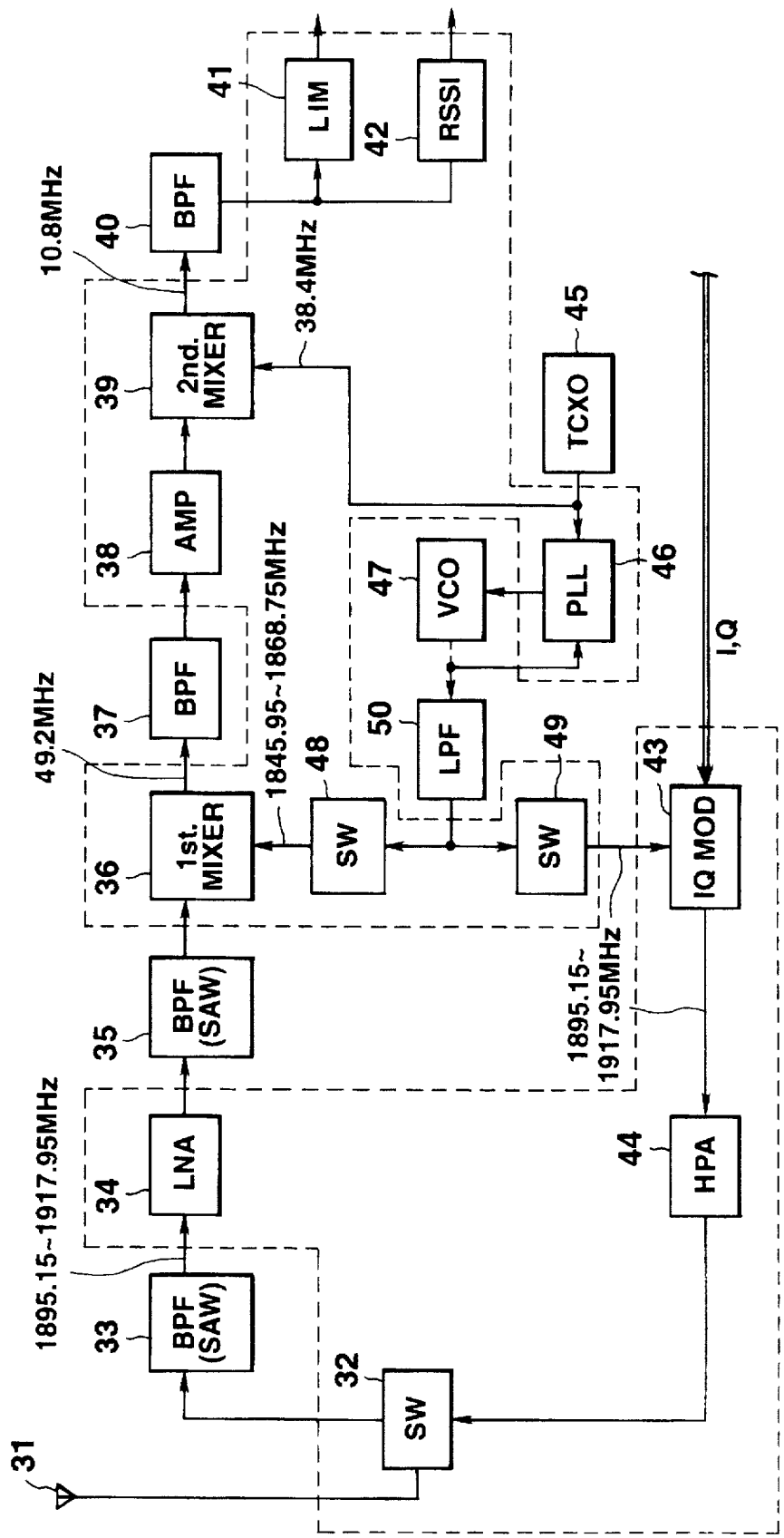
FIG. 6 is a block diagram of the first embodiment of a transmitter-receiver according to the present invention.

FIG. 6 is a block diagram showing the configuration of the first embodiment. An antenna 31 is used for both transmission and reception. A switch 32 is provided between the antenna 31 and a receiver/transmitter circuit and switches the antenna 31 to one of the receiver circuit and the transmitter circuit.

The receiver circuit comprises a surface acoustic wave (SAW) bandpass filter 33, a low-noise amplifier (LNA) 34 as a first amplifier, a SAW bandpass filter 35, a first mixer 36, a bandpass filter 37, a second amplifier 38, a second mixer 39, a bandpass filter 40, a limiter 41, and an RSSI 42. Two SAW bandpass filters 33 and 35 are used in order to sufficiently reject the image frequency of the first mixer and leak the local signal of the first mixer. In FIG. 6, the first amplifier 34 is provided between the two SAW bandpass filters 33 and 35. However, it is also possible to connect the bandpass filters 33 and 35 in series and connect the first amplifier 34 to the output of the second bandpass filter 35. Also, the bandpass filters need not be SAW filters but can be any filters as long as the filters can realize the frequency characteristics to be described later. For example, a number of dielectric filters can be connected, provided that the gain of a carrier frequency is not lowered during transmission and the transmission loss of a desired wave is not increased during reception.

The transmitter circuit includes a high-power amplifier (HPA) 44 and a quadrature modulator 43.

The transmitter-receiver further comprises a local signal generator and a TCXO circuit 45. The local signal generator includes a PLL circuit 46, a VCO 47, a low-pass filter (LPF) 50, and switches 48 and 49 and generates a first receiving local signal to be supplied to the first mixer 36 and a transmitting local signal to be supplied to the quadrature modulator 43. The TCXO circuit 45 supplies a reference oscillation signal to the PLL circuit 46 and a second receiving local signal to the second mixer 39. Although not shown, a control circuit supplies a control signal for determining the oscillation frequency of the VCO 47 to the PLL circuit 46.

The components except the filters and the oscillators of the transmitter-receiver of this embodiment can be integrated into two units as indicated by the broken lines in FIG. 6. One unit includes the switch 32, the LNA 34, the HPA 44, and the quadrature modulator 43. The other unit includes the mixers 36 and 39, the amplifier 38, the limiter 41, the RSSI 42, the PLL 46, and the switches 48 and 49.

The operation of this embodiment will be described below.

Figure 7:
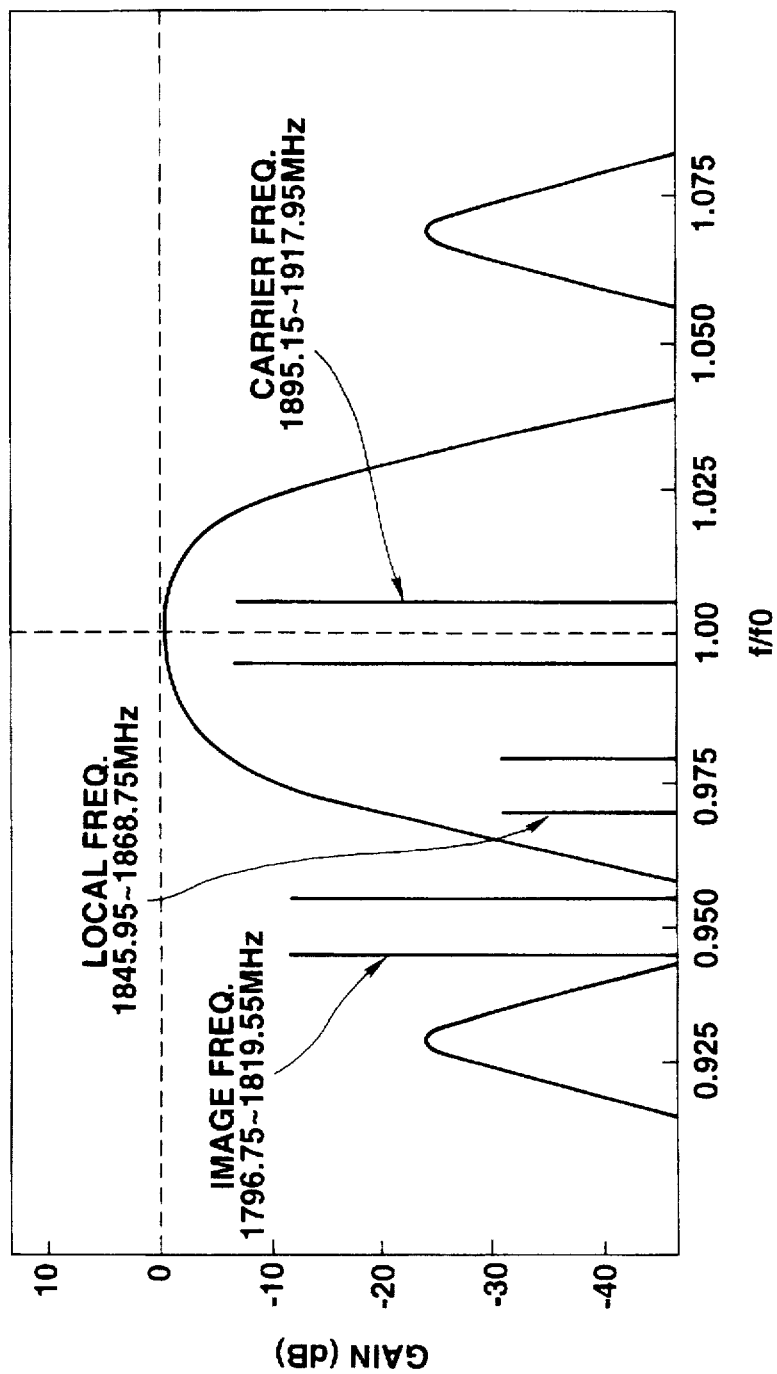
FIG. 7 is a graph showing the frequency characteristics of SAW bandpass filters used in the first embodiment.

A radio signal received by the antenna 31 is input to the receiver circuit via the switch 32. The SAW bandpass filter 33 extracts a signal of a predetermined frequency band including a carrier frequency band (1895.15 to 1917.95 MHz) from the radio signal. FIG. 7 illustrates the frequency characteristics of the filters 33 and 35. Since the SAW bandpass filters 33 and 35 can realize steep frequency characteristics, a band of 1796.75 to 1819.55 MHz which is 95% of the carrier frequency band (1895.15 to 1917.95 MHz) can be set as a reception interference wave (image frequency signal of the first mixer) to be removed.

The output from the SAW bandpass filter 33 is supplied to the low-noise amplifier 34 where the output is amplified with a predetermined amplification factor, and the amplified signal is supplied to the SAW bandpass filter 35.

The SAW bandpass filter 35 (having the same characteristics as in FIG. 7) further extracts a signal of a frequency band near the carrier frequency band from the amplified signal supplied from the low-noise amplifier 34, and outputs the extracted signal to the first mixer 36.

The first mixer 36 converts the input carrier frequency band signal from the SAW bandpass filter 35 into an intermediate-frequency signal of 49.2 MHz by using the first local signal (1845.95 to 1868.75 MHz) supplied from the local signal generator via the switch 48, and outputs the intermediate-frequency signal to the bandpass filter 37.

The bandpass filter 37 removes a signal of an unnecessary frequency band (image frequency signal of the second mixer) from the output intermediate-frequency signal from the first mixer 36 and outputs the resultant signal to the second amplifier 38. The second amplifier 38 amplifies the input intermediate-frequency signal from the bandpass filter 37 with a predetermined amplification factor and outputs the amplified signal to the second mixer 39.

The second mixer 39 frequency-converts the 49.2-MHz intermediate-frequency signal amplified by the second amplifier 37 into a 10.8MHz baseband signal by using the second local signal (38.4 MHz) supplied from the TCXO circuit 45, thereby outputting a desired signal. The output signal of the second mixer 39 is supplied to the bandpass filter 40.

The bandpass filter 40 removes an unnecessary frequency band signal from the input baseband signal from the second mixer 39 and outputs the resultant signal to the limiter 41 and the RSSI 42.

The limiter 41 cuts upper and lower components exceeding predetermined levels from the amplitude of the input baseband signal from the bandpass filter 40, and supplies the signal as a phase component to a modem unit (not shown) in the subsequent stage. The RSSI circuit 42 detects the reception level of the input baseband signal from the bandpass filter 40 and supplies the detected level as an amplitude component to a control circuit (not shown) in the subsequent stage.

In the transmitter circuit, on the basis of baseband signals I and Q supplied from the modem unit (not shown) to the transmitter circuit, the quadrature modulator 43 modulates a transmitting local signal (1895.15 to 1917.95 MHz) supplied from the local signal generator via the switch 49, generating a modulated signal. The quadrature modulator 43 outputs this modulated signal to the high-power amplifier 44. The high-power amplifier 44 amplifies the input carrier band modulated signal from the quadrature modulator 43 with a predetermined amplification factor and transmits the amplified signal as a radio signal from the antenna 31 via the switch 32.

The TCXO circuit 45 is an oscillation circuit which oscillates a 38.4-MHz reference oscillation signal. The TCXO circuit 45 outputs this reference oscillation signal to the PLL circuit 46 and to the second mixer 39 as the second local signal. The PLL circuit 46 controls the frequency of the output signal of the VCO 47 so as to fix to a desired frequency by using the reference oscillation signal supplied from the TCXO circuit 45.

On the basis of a change in voltage of the reference oscillation signal from the PLL circuit 46, the VCO 47 generates the first receiving local signal (1845.95 to 1868.75 MHz) to be supplied to the first mixer 36 in the receiver circuit and the transmitting local signal (1895.15 to 1917.95 MHz) to be supplied to the quadrature modulator 43 in the transmitter circuit.

The low-pass filter 50 has a function of removing harmonic components which are integer multiples of the oscillation frequency of the VCO 47. With this function, it is possible to accurately control the frequency of the local signal, and consequently an inexpensive VCO whose linearity in the output characteristic is low can be used as the VCO 47. Accordingly, if the linearity of the VCO 47 is high, the low-pass filter 50 can be omitted.

In the transmitter-receiver of this embodiment as described above, the bandpass filter in the input stage of the receiver circuit is constituted by the SAW bandpass filters 33 and 35 which pass a signal of 1895.15 to 1917.95 MHz. Accordingly, as illustrated in FIG. 7, a band of 1796.75 to 1819.55 MHz which is 95% of the carrier frequency band can be set as the frequency band (image frequency of the first mixer) of a reception interference wave to be removed. The dielectric bandpass filters 4 and 5 used in the input stage of the conventional receiver circuit illustrated in FIG. 1 have the frequency characteristics as shown in FIG. 2. Therefore, a band of 1415.05 to 1437.85 MHz which is 75% of the carrier frequency band is set as the image frequency band. Consequently, the frequency band of the first receiving local signal is set to correspond to this image frequency band, and so it is not possible to lower the intermediate frequency band to be converted by the first mixer 7. In this embodiment, however, the image frequency band of the transmitting/receiving system is designed in accordance with the passing frequency band of the SAW filter. Accordingly, the frequency of the first receiving local signal can be raised, and the output intermediate frequency from the first mixer 36 can be lowered. Since the intermediate frequency is lowered, the signal processing becomes easy so that it is easy to design the circuit.

The local frequency bands of the local signal generator in this embodiment are designed as indicated by the following equations:

$$1895.15-(1895.15-1796.75)/2=1845.95 \text{ MHz} \quad (1)$$

$$1917.95-(1917.95-1819.55)/2=1868.75 \text{ MHz} \quad (2)$$

Figure 1:
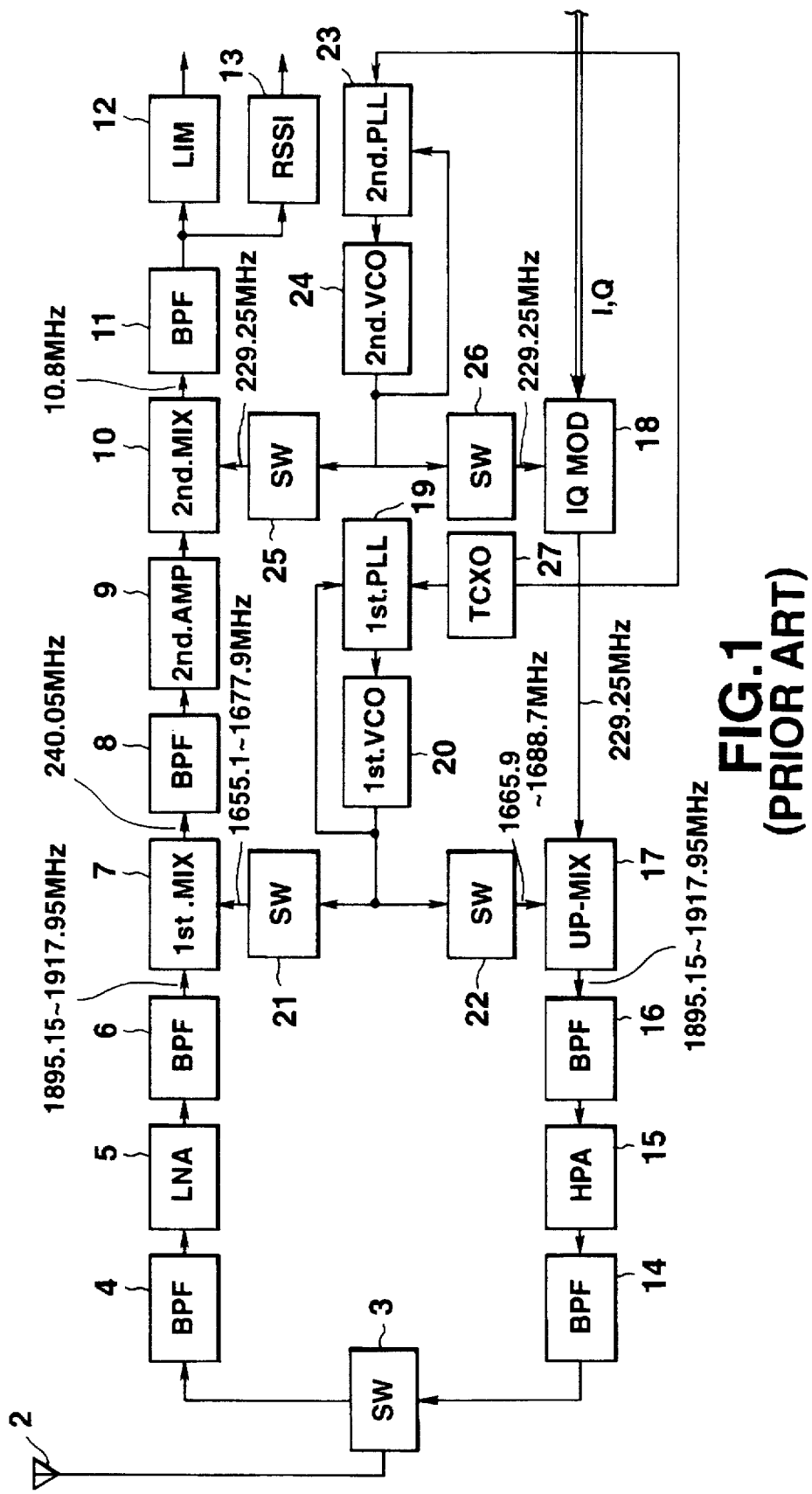
FIG. 1 is a block diagram of an indirect modulation type transmitter-receiver as a conventional example of transmitter-receivers used as radio communication terminals.
Figure 2:
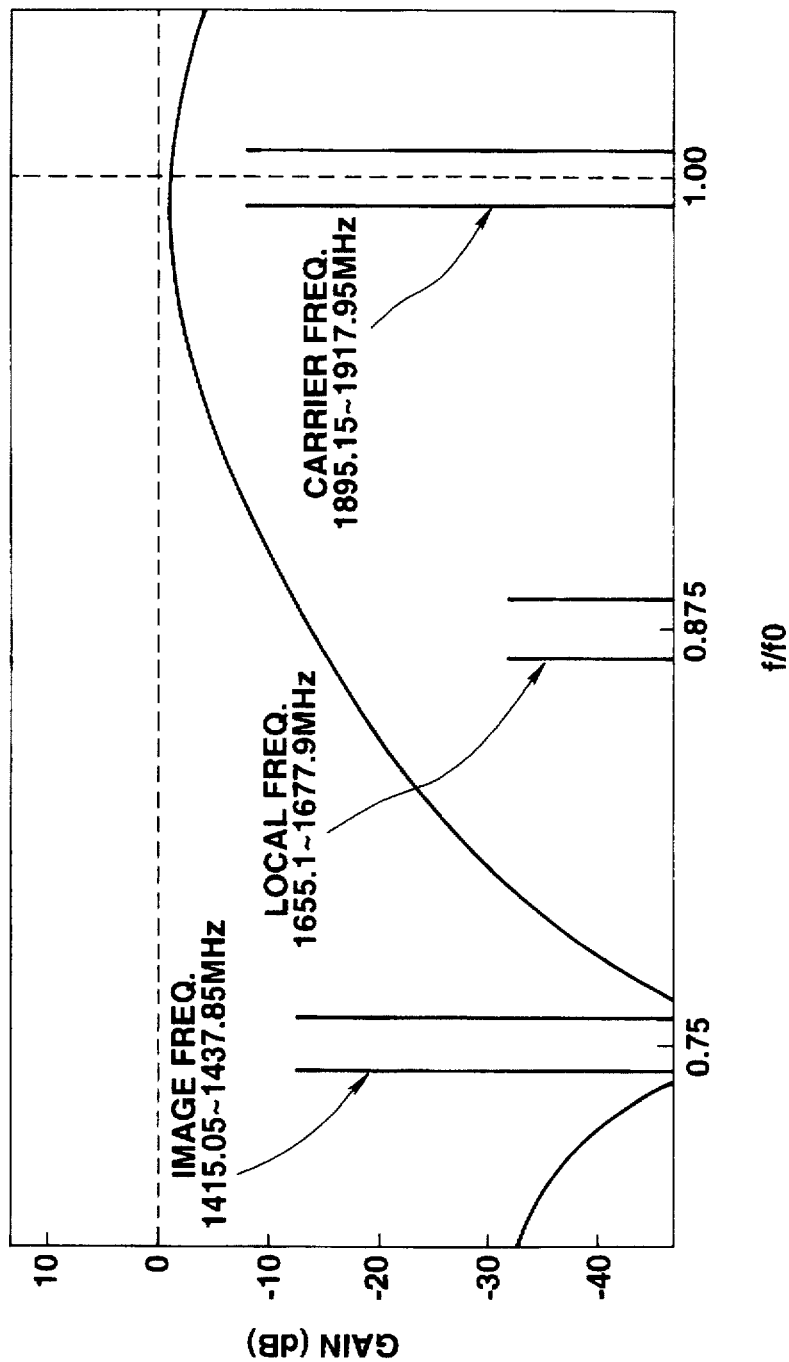
FIG. 2 is a graph showing the frequency characteristics of dielectric bandpass filters used in the transmitter-receiver in FIG. 1.

Accordingly, the intermediate frequency generated by the first mixer 36 can be as very low as 49.2 MHz compared to the intermediate frequency (240.05 MHz) of the conventional receiver circuit shown in FIG. 1. Consequently, the frequency of the local signal of the second mixer in the receiver circuit can be lowered, and so the output from the oscillation circuit can be directly used as the second local signal without using any PLL circuit. For example, if the baseband frequency is the same frequency (10.8 MHz) as in the conventional transmitter-receiver, the frequency of the second local signal required for demodulation can be set to 38.4 MHz. Accordingly, the TCXO circuit 45 alone can stably oscillate the second local signal without using the conventional circuit configuration (FIG. 1) in which the second local signal generator is constituted by VCO and PLL circuits.

Although the oscillation frequency of the TCXO circuit 45 changes in accordance with the communication system used, the frequency is determined by (1) a channel frequency interval and (2) a base band frequency. For example, in a PHS (Personal Handyphone System), the channel interval is 300 KHz and the base band frequency is 192 KHz. Accordingly, the reference oscillation frequency is an M multiple (M: integer) of 9.6 MHz which is the least common multiple of these frequencies.

In the above embodiment, the local frequency band of the receiver circuit is 1845.95 to 1868.75 MHz and the modulation frequency band of the transmitter circuit is 1895.15 to 1917.95 MHz; i.e., the two frequency bands are very close. This makes it possible to integrate the receiving local signal VCO/PLL circuit and the transmitting signal modulating VCO/PLL circuit.

Compared to the conventional transmitter-receiver shown in FIG. 1, therefore, the transmitter-receiver of this embodiment requires only a VCO/PLL circuit of 1845.95 to 1917.95 MHz. Consequently, the 229.25-MHz VCO/PLL circuit shown in FIG. 1 can be omitted, and this reduces the consumption power of that circuit and makes the up-converting mixer in the transmitter circuit unnecessary. The result is a further reduced consumption power.

Additionally, the above mentioned up converting mixer is not provided in the transmitter circuit of the above embodiment. Therefore, the bandpass filter for removing a spurious component generated from the up converting mixer can be omitted from the transmitter-receiver, and the circuit scale can therefore be decreased.

Furthermore, since the local signal generator can be constituted by a single VCO/PLL circuit, the circuit scale can be decreased compared to the conventional transmitter-receiver. When the transmitter-receiver is formed into an LSI, therefore, the chip size can be decreased and this realizes a low cost. Also, the signal source for the second local signal which is necessary in the receiver circuit is realized by the TCXO circuit 45 which operates with a very low consumption power and generates the reference signal to the VCO/PLL circuit for generating the first local signal. Consequently, the consumption power can be reduced even during reception.

Figure 3:
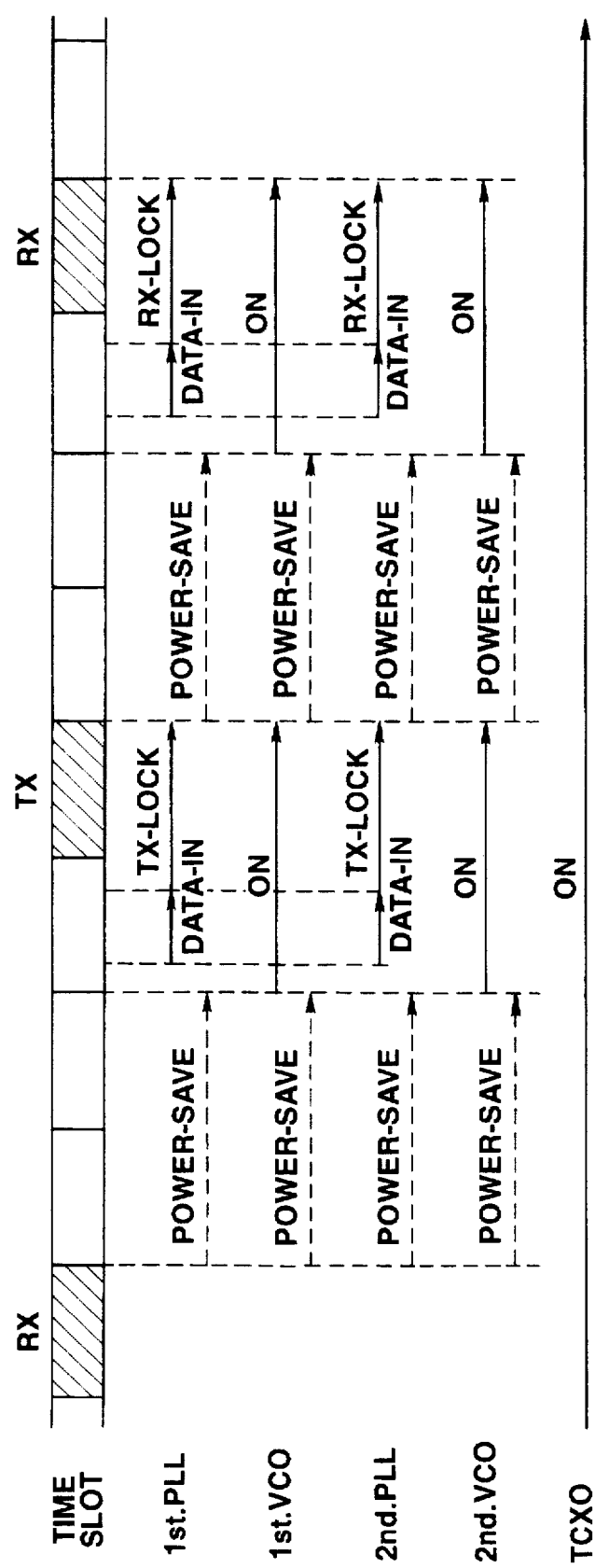
FIG. 3 is a timing chart showing the operation of the transmitter-receiver in FIG. 1.
Figure 4:
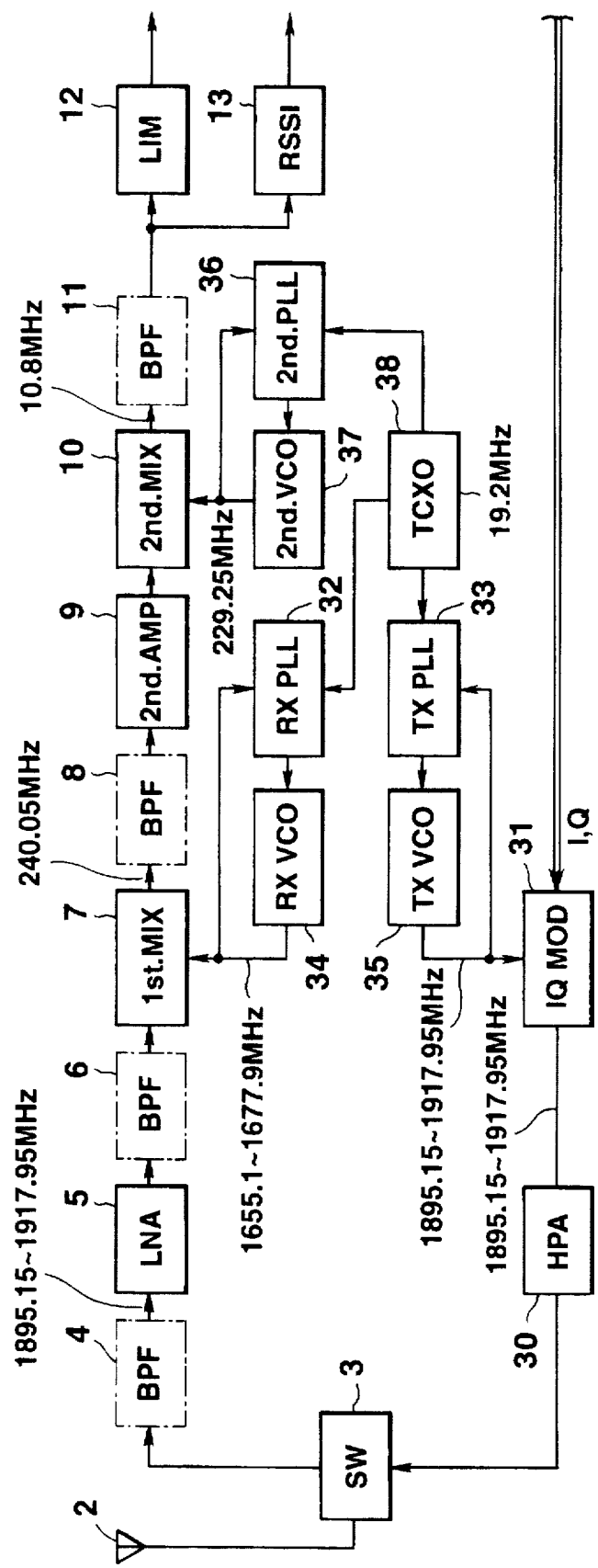
FIG. 4 is a block diagram of a direct modulation type transmitter-receiver as another conventional example of transmitter-receivers used as radio communication terminals.
Figure 5:
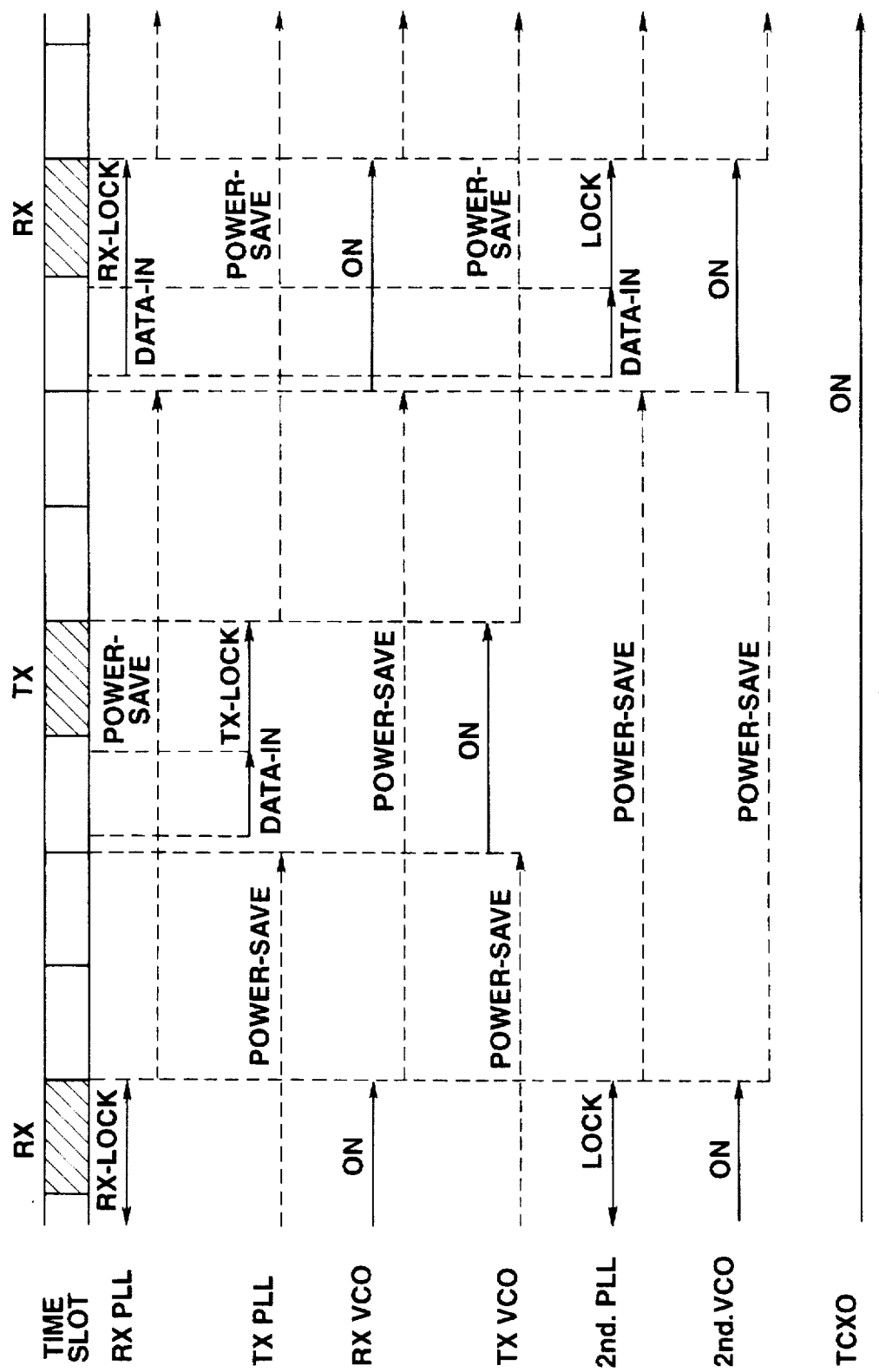
FIG. 5 is a timing chart showing the operation of the transmitter-receiver in FIG. 4.
Figure 8:
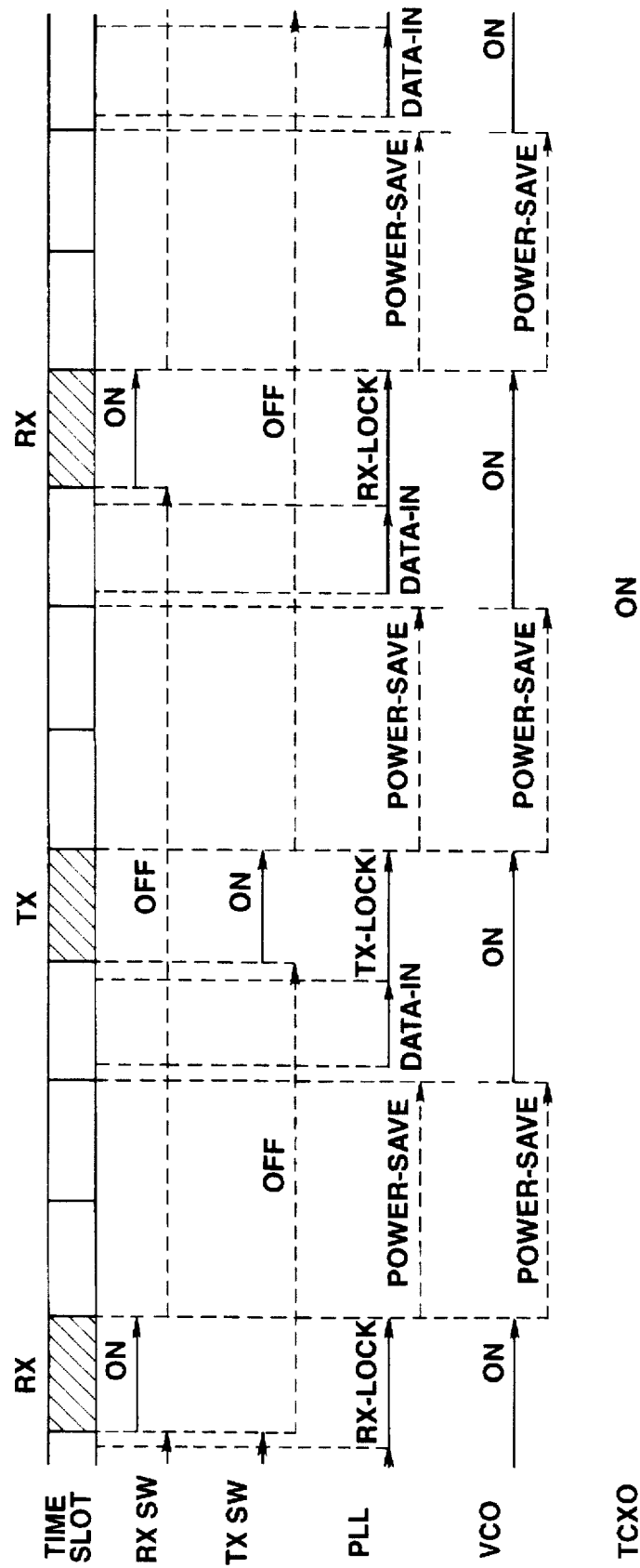
FIG. 8 is a timing chart showing the operation of the first embodiment.

The consumption power reducing effect of the transmitter-receiver of this embodiment can also be seen by comparing a timing chart of transmitting and receiving operations shown in FIG. 8 with the timing chart of transmitting and receiving operations of the conventional transmitter-receiver shown in FIG. 3 or 5.

More specifically, in this embodiment, a single VCO/PLL circuit is used for both reception and transmission. As illustrated in FIG. 8, therefore, the number of circuit blocks (a PLL circuit, a VCO, and a TCXO) acting in the transmission and reception slots is smaller than the number of circuit blocks (an RX PLL circuit, an RX VCO, a TX VCO, a second PLL circuit, and a second VCO) acting in the conventional transmission and reception slots shown in FIG. 3 or 5. Also, in each power-save state during an empty slot, the number of circuit blocks requiring power save is small.

Accordingly, when the transmitter-receiver of this embodiment is used as a TDMA-TDD radio communication terminal, the lifetime of a battery can be prolonged, and this prolongs the continuous waiting time and the continuous speech communication time.

In this embodiment as described above, a single local signal generator can generate a local signal necessary for demodulation of a received signal and a local signal necessary for modulation of a transmitting signal. Consequently, the number of circuit blocks constituting the transmitter-receiver can be decreased, and this decreases the circuit scale. Also, the consumption power during transmitting and receiving operations can be reduced. As a result, a low cost of the transmitter-receiver is realized.

Furthermore, the receiver circuit requires the first and second local signals, the first local signal generated by the local signal generator has a higher frequency than that of the second local signal, and the second local signal is the output from the oscillator which generates the reference signal of the local signal generator. Accordingly, the number of circuit blocks constituting the transmitter-receiver can be further decreased to decrease the circuit scale. Additionally, the consumption power during transmitting and receiving operations can be further reduced.

Other embodiments of the present invention will be described. The same portions as those of the first embodiment will be indicated in the same reference numerals and their detailed description will be omitted.

Figure 9:
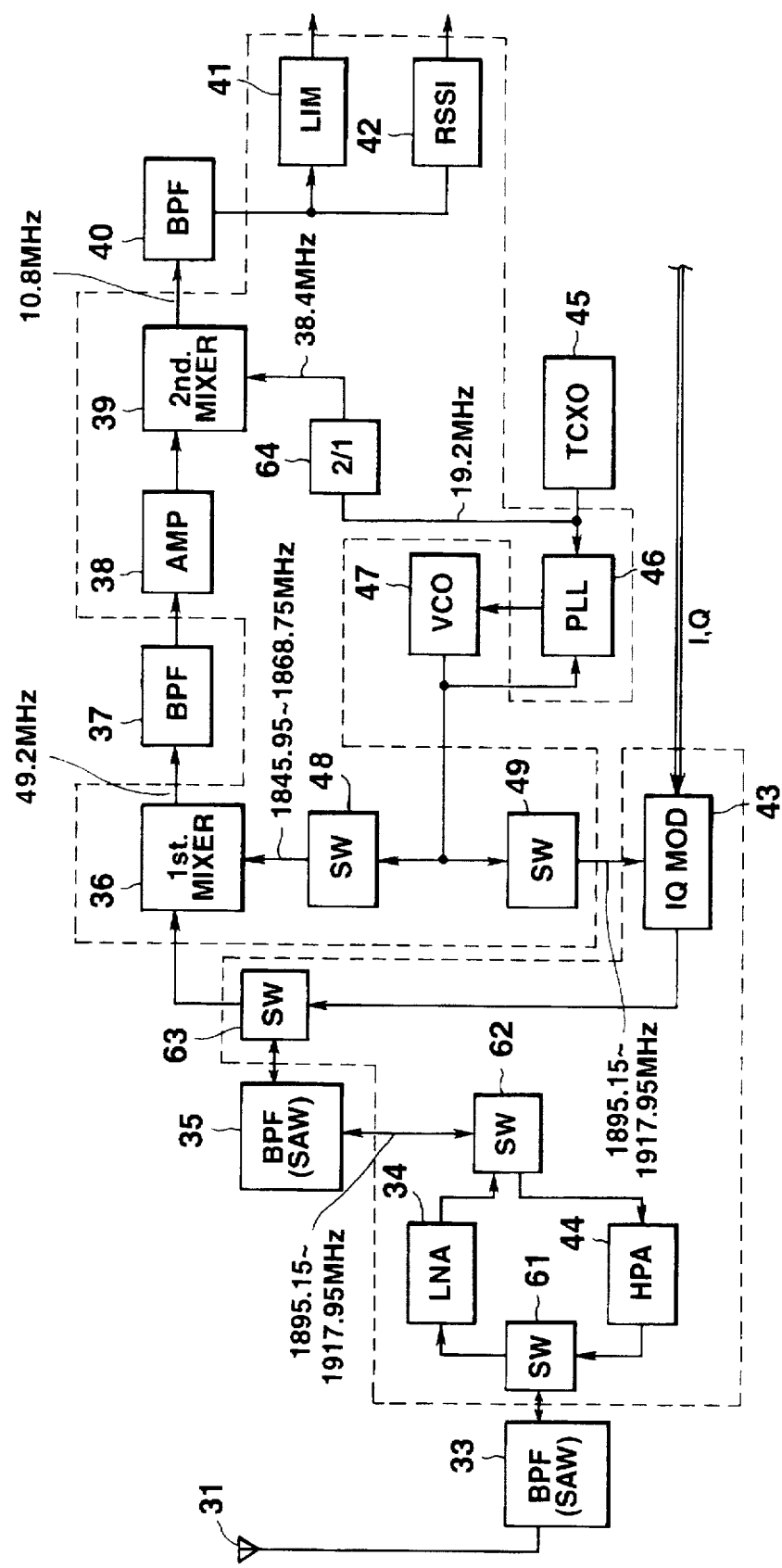
FIG. 9 is a block diagram of the second embodiment of the transmitter-receiver according to the present invention.

FIG. 9 is a block diagram of the second embodiment. An antenna 31 is connected to a SAW bandpass filter 33 which is connected to a switch 61 for switching transmission and reception. A received signal is supplied to the SAW bandpass filter 35 via a switch 62 interlocked with the switch 61 via the low-noise amplifier 34. The output received signal from the SAW bandpass filter 35 is supplied to the first mixer 36 via a switch 63 interlocked with the switches 61 and 62. The configuration of a receiver circuit and the subsequent blocks is identical with that in the first embodiment.

In a transmitter circuit, an output modulated signal from the quadrature modulator 43 is supplied to the bandpass filter 35 via the switch 63. The output transmitting signal from the bandpass filter 35 is supplied to a high-power amplifier 44 via the switch 62 and transmitted from the antenna 31 via the switch 61 and the bandpass filter 33.

In this embodiment, the oscillation frequency of the TCXO circuit 45 is not the frequency (38.4 MHz) of a local signal of the second mixer 39 but 19.2 MHz which is an integer multiple of 9.6 MHz, and the harmonic component (38.4 MHz) of the TCXO is extracted via a doubler circuit 64 which is indicated by "2/1" in FIG. 9. Although the reference clock of the first local signal PLL circuit 46 is also 19.2 MHz, this clock need only be an integer multiple of 50 KHz. Therefore, 38.4 MHz as the output from the doubler circuit 64 can also be supplied as the clock. If this is the case, however, the reference frequency dividing ratio of the first local PLL circuit 46 is doubled. Furthermore, the fundamental oscillation of the TCXO circuit 45 can be a frequency other than 19.2 MHz as long as the frequency is a multiple of 9.6 MHz. Even if this is the case, it is only necessary to extract 38.4 MHz as the harmonic component and supplies it to the second mixer 39.

As described above, by using the bandpass filters 33 and 35 in both transmission and reception by properly switching them using the switches 61, 62, and 63, it is possible to remove the harmonic component which is an integer multiple of the oscillation frequency of the VCO 47. Accordingly, an inexpensive VCO whose linearity in the output characteristic is low can be used as the VCO 47 without connecting a low-pass filter to the output of the VCO 47.

In the transmitter-receiver for a radio communication apparatus according to the present invention as has been described above, a narrow-bandpass filter extracts a signal of a carrier frequency band from a received signal. A frequency-converting means frequency-converts this extracted carrier frequency band signal into a signal of a desired frequency by using a receiving local signal. A modulating means modulates a transmitting local signal of the carrier frequency band by using transmitting data. In this transmitter-receiver, the receiving local signal and the transmitting local signal are time-divisionally generated by a single local signal generating means. That is, this single local signal generator can generate the local signal necessary for demodulation in a receiver circuit and the local signal necessary for modulation in a transmitter circuit. Consequently, the number of circuit blocks constituting the transmitter-receiver can be decreased, and this decreases the circuit scale. Also, the consumption power during transmitting and receiving operations can be reduced. As a result, a low cost of the transmitter-receiver is realized.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents. For example, although the above embodiments are singly explained, these embodiments can be properly combined. That is, in the first embodiment, the output from the TCXO circuit 45 can be supplied to the second mixer 39 not directly but by passing it through a doubler circuit. Also, in the second embodiment a low-pass filter can be further connected to the output of the VCO 47.

What is claimed is:

1. A transmitter-receiver for a radio communication apparatus, comprising:

a receiver amplifier for amplifying a received signal;

a filter device comprising a surface acoustic wave filter for extracting a signal of a carrier frequency band from an output of said receiver amplifier;

a frequency convertor for converting the carrier frequency band signal extracted by said filter device into a signal of a desired frequency by using a receiving local signal;

a modulator for modulating a transmitting local signal of the carrier frequency band by using transmitting data;

a transmitter amplifier for amplifying an output of said modulator; and a local signal generator for time-divisionally, selectively generating the receiving local signal and the transmitting local signal, and wherein:

said frequency convertor comprises a first frequency convertor for converting the carrier frequency band signal extracted by said filter device into an intermediate-frequency signal by using a first receiving local signal, and a second frequency convertor for converting the intermediate-frequency signal into the desired-frequency signal by using a second receiving local signal, said local signal generator comprises a first local signal generator for supplying the first receiving local signal to said first frequency convertor, and the transmitting local signal to said modulator and a second local signal generator for supplying the second receiving local signal to said second frequency convertor, said first local signal generator comprises a voltage-controlled oscillation circuit and a PLL circuit which is supplied with an output from said second local signal generator and an output from said voltage-controlled oscillation circuit, and said second local signal generator comprises an oscillation circuit with a fixed oscillation frequency and a multiplication circuit for increasing an output frequency of said oscillation circuit by an integer value, an output from said multiplication circuit being the second receiving local signal.

2. A transmitter-receiver according to claim 1, wherein said first local signal generator further comprises a low-pass filter connected to an output terminal of said voltage-controlled oscillation circuit to remove a harmonic component of an oscillation frequency of said voltage-controlled oscillation circuit.

3. A transmitter-receiver according to claim 1, wherein said surface acoustic wave filter comprises a surface acoustic wave bandpass filter having an image frequency band which is 95% of the carrier frequency.

4. A transmitter-receiver according to claim 1, wherein said transmitter-receiver is applied to a time division multiple access(TDMA)-time division duplex(TDD) radio communication apparatus.

5. A transmitter-receiver according to claim 1, further comprising:

a first switching device for selectively connecting one terminal end of said filter device to one of said receiver amplifier and said transmitter amplifier;

a second switching device for selectively connecting another terminal end of said filter device to one of said frequency converter and said modulator; and a controller for switching maid first switching device and said second switching device such that an output of said receiver amplifier is supplied to said frequency converter through said filter device during a receiving mode, and an output of said modulator is supplied to said transmitter amplifier through said filter device during a transmitting mode.

* * * * *